United States Patent
Lambrigts et al.

(10) Patent No.: US 7,218,725 B2
(45) Date of Patent: *May 15, 2007

(54) INTERFACE MEANS BETWEEN A NETWORK SWITCH AND A CTI SERVER MEANS AND APPARATUS FOR PROVIDING A SERVICE TO A CUSTOMER INCLUDING SUCH AN INTERFACE MEANS

(75) Inventors: Michael Lambrigts, Kampenhout (BE); Philip Van Cleven, Deinze (BE); Stefaan Coussement, Kortrijk (BE)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/442,539

(22) Filed: May 30, 2006

(65) Prior Publication Data

US 2006/0233343 A1    Oct. 19, 2006

Related U.S. Application Data

(63) Continuation of application No. 10/895,316, filed on Jul. 12, 2004, which is a continuation of application No. 09/346,930, filed on Jul. 2, 1999, now Pat. No. 6,842,514.

(30) Foreign Application Priority Data

Jul. 3, 1998    (EP) .................................. 98401681

(51) Int. Cl.
*H04M 7/00*    (2006.01)

(52) U.S. Cl. .................................. 379/230; 379/221.08

(58) Field of Classification Search ........... 379/207.02, 379/219, 220.01, 221.08–221.12, 229, 230
See application file for complete search history.

(56) References Cited

U.S. PATENT DOCUMENTS

| 6,026,087 | A | 2/2000 | Mirashrafi et al. |
| 6,044,142 | A | 3/2000 | Hammarstrom et al. |
| 6,094,479 | A | 7/2000 | Lindeberg et al. |
| 6,327,359 | B1 | 12/2001 | Kang et al. |
| 6,426,950 | B1 * | 7/2002 | Mistry .................. 370/352 |

FOREIGN PATENT DOCUMENTS

| EP | 0 836 295 A2 | 4/1998 |
| WO | WO 98/01987 | 1/1998 |
| WO | WO 98/51092 | 11/1998 |

OTHER PUBLICATIONS

Andrew Cray, "Major Hassles, Major Payoffs", Data Communications, vol. 26, No. 13, Oct. 1997, pp. 127-130, 132, 134, 136.

* cited by examiner

*Primary Examiner*—Benny Quoc Tieu
(74) *Attorney, Agent, or Firm*—Sughrue Mion, PLLC

(57) ABSTRACT

A method for providing a telephony service, the method including coupling an interface device directly between a network switch of a public intelligent network and a computer telephony integration server, the network switch being coupled to a service switching function device having service switching functionality; at the interface device, handling call handling messages between the service switching function device and the computer telephony integration server.

25 Claims, 6 Drawing Sheets

INTERFACE MEANS BETWEEN A NETWORK SWITCH AND A CTI SERVER MEANS AND APPARATUS FOR PROVIDING A SERVICE TO A CUSTOMER INCLUDING SUCH AN INTERFACE MEANS

BACKGROUND OF THE INVENTION

This is a Continuation Application of application Ser. No. 10/895,316 filed Jul. 21, 2004, which is a Continuation Application of U.S. application Ser. No. 09/346,930 filed Jul. 2, 1999, now U.S. Pat. No. 6,842,514. The entire disclosures of prior application Ser. Nos. 10/895,316 and 09/346,930 are considered part of the disclosure of this Continuation Application and are hereby incorporated by reference.

The present invention relates to an interface means between a network switch and a Computer Telephony Integration, hereafter abbreviated with CTI, server means and to a method and an apparatus for providing a service to at least one customer.

Such an apparatus, wherein a network switch as well as a CTI server means are coupled via a particular interface, is already known in the art, e.g. from the PCT application WO 98/01987, "Method and apparatus for implementing a network call center". Therein a network provider call center is described, offering automated call distribution services to customers outside it. This network provider call center includes a network switch and a computer-telephony integration, abbreviated as CTI, system. This CTI system includes a CTI server, a stat-server and a routing server. The latter two devices are needed for offering the automated call distribution service of the prior art system, and as such correspond to the executable means for executing the service. The CTI server, as is described on page 8 of the prior art document, thereby acts as a bridge between the network switch on one hand, and an application programming interface to the executable means comprising the prior art stat-server and routing server on the other hand.

Within the prior art system, the network switch is directly coupled to the CTI-server, via a CTI link of this network switch, as is stated in line 15 of page 8 of the prior art document. The interface means of the prior art system thus consists of such a specific CTI-link. Such a CTI-link may for instance consist of a standardised CSTA interface, whereby CSTA is the abbreviation of Computer Supported Telecommunications Applications. At the time of the invention, however, most of these public switching network switches do not contain such a CTI link, and consequently need to be especially equipped with this. Furthermore, as is explicitly mentioned in lines 12 to 14 of page 8 of the prior art document, in case a network operator who is possessing various types of such network switches manufactured by different companies, wants to offer call center services throughout its network, different versions of such CTI servers have to be implemented and installed, in order to match with the variety of switches made by the different manufacturers. Together with the fact that these different versions of the CTI server can only interface with the various network switches on the condition that these network switches have such a CTI-link, the prior art solution is very complicated and expensive for public switching network operators, since each network switch has to be specially equipped with a CTI-link and per type of switch a dedicated CTI server is to be used.

SUMMARY OF THE INVENTION

An object of the present invention is therefore to provide an interface and an apparatus of the above known type, but which solves the current problem of switch and CTI server incompatibility.

According to the invention, this object is achieved due to the fact that said interface means is further adapted as is explained in the characteristic part of the first claim and that said apparatus further includes such an interface means.

In this way, the interface means, adapted to interface now between a service switching function device within the public network switch on one hand, and the CTI server on the other hand, thereby acts as a universal bridge between these two domains. Since both the service switching function device in the public network domain and the CTI function in the CTI domain have a standardised interface, such as the CS1 or CS-2 interface for the service switching function in the public network domain and for instance the CSTA interface for the CTI domain respectively, an interface means which is adapted to communicate with and to convert from one standardised interface to the other, allows any network switch supporting such public network standard to be coupled to any CTI-server supporting such CTI standard. This solution thereby provides a universal platform for accessing services as these are incited from the CTI server, thus providing an apparatus in which any type of network switch with a standardised public switching interface may be coupled to any type of CTI server means with a standardised CTI interface.

In this way the call handling function at the CTI side is completely performed by the CTI call handling device of the interface means. This CTI call handling functionality is thereby removed from the CTI server to the interface means, again keeping the CTI server simple and cheap.

Thereby, upon executing a particular call service scenario, a returning CTI call handling message is generated.

Yet another characteristic feature of the present invention is described in claim 4.

Similarly, also a service request control message is generated for transmission towards the network switch side, upon execution of a specific CTI call service scenario. This specific CTI service scenario thereby may be the same or may be different from the one for which a returning CTI call handling message is generated.

Thereby public switching network call handling messages, such as for instance standardised CS2 Intelligent Network protocol call handling messages, are received within a mapping device, incorporated within the interface means. The mapping device is thereby adapted to perform public switch call handling. The mapping device thereby acts as a service control function of the service switching function of the public network switch. Indeed, due to the public switching call handling functionality incorporated within the mapping device, the call handling performed within the switch can be reduced to a basic level, whereas within the mapping device call handling can be performed at a higher level of abstraction, related to the intelligent network service control function approach. This creates an enormous advantage since with this architecture, services, such as automated call distribution services, can now be provided as a service of an intelligent network environment. This presents advantages of routing control, network wide coverage, and charging control.

Thereby, returning public switching call handling messages for transmission towards the network side, as well as control messages for transmission towards the CTI side, are generated by the mapping device.

In this way CTI call handling scenarios are performed on a particular call, of which the incoming call handling message originated from the public network switching domain. This action may be followed by the generation of at least one other CTI call handling message for delivery to the CTI domain. This latter CTI message can thus be considered as a corresponding message, in the CTI domain, of the original incoming public switching call handling message.

As was the case when a CTI call handling scenario was performed on a call handling message from the CTI domain, also in this case a service request control message is generated for back transmission towards the public switching network side.

Thereby the mapping device is adapted to perform public switching call service scenario's on a specific call associated to a message provided by the CTI domain. Thereby other public switching call handling messages are generated, these thereby to be considered as corresponding to the original call handling message from the CTI domain. Other control messages are generated for retransmission back to the CTI call handling device.

In this way, both the CTI call handling device as well as resp. the mapping device determine the actual value of the CTI, resp. public switching, call attributes such as the call state, calling number and called number, of the call associated to their received input message, and update at least one value of these call attributes upon performing a CTI, resp. a public switching call service scenario.

In the descriptive part of this document embodiments of a CTI call handling device and of a mapping device, adapted to determine these actual and updated call attributes, are extensively described.

Thereby the CTI call handling device includes a first plurality of CTI call service scenario devices, each adapted to perform a distinct CTI call service scenario on a call associated to an incoming CTI call handling message. The decision about which incoming call handling message is forwarded to which CTI call service scenario device, is performed by a first selection means, also incorporated within the CTI call handling device, and is based upon at least one value of the call attributes of the call associated to this incoming call handling message.

Similar to the CTI call handling device, the mapping device also includes a second plurality of public switching call service scenario devices, each adapted to perform a distinct public switching call service scenario on a call associated to an incoming public switching call handling message. Again a second selection means is adapted to decide which incoming public switching call handling message is to be forwarded to which public switching call service scenario device, this decision also based upon at least one value of the call attributes of the call associated to this incoming public switching call handling message.

Thereby, also for the messages received from the mapping device, such as for instance the above described control messages, a selection is performed within the CTI call handling device, by means of a third selection means which decides which mapping device message will be forwarded to an associated CTI call service scenario device of a third plurality. These CTI call service scenario devices of the third plurality are performing CTI call service scenario's which are substantially different from those performed by the CTI call service scenario devices of the first plurality. This is because CTI call handling protocols itself are asymmetrical.

Similarly, the decision concerning which CTI call service scenario is selected is performed by the third selection means, based on at least one value of the CTI call attributes of the call associated to the incoming mapping device message.

Similar to the CTI call handling device, the mapping device also includes a fourth selection means adapted to discriminate amongst incoming messages received from the CTI call handling device, such as the above mentioned service request control signals. These CTI call handling device messages are as well forwarded to a public switching call service scenario device of a fourth plurality, based on at least one value of the public switching call attributes of the call associated to the incoming CTI call handling device message.

The public switching call service scenario's performed by similar named devices of the fourth plurality are different from those performed by the devices of the second plurality. The reason behind this difference is also related to the asymmetry of the public switching call handling protocol itself.

The interface means may as well be part of an apparatus.

In this way the interface means interfaces with several service switching function devices which may be residing on different or on the same network switches. This has the advantage that only one application, being the CTI server application as provided by the CTI server means itself, or an application from an executable means coupled via the application programming interface to the CTI server means, can control several service switching functions at the same time. This was until now not possible with the prior art architecture.

The interface means may thereby also interface with several CTI servers. Since each of these CTI server may be coupled to an application programming interface from which several applications or services may be invoked, this architecture thereby increases the amount of available services to be offered by for instance a network operator.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
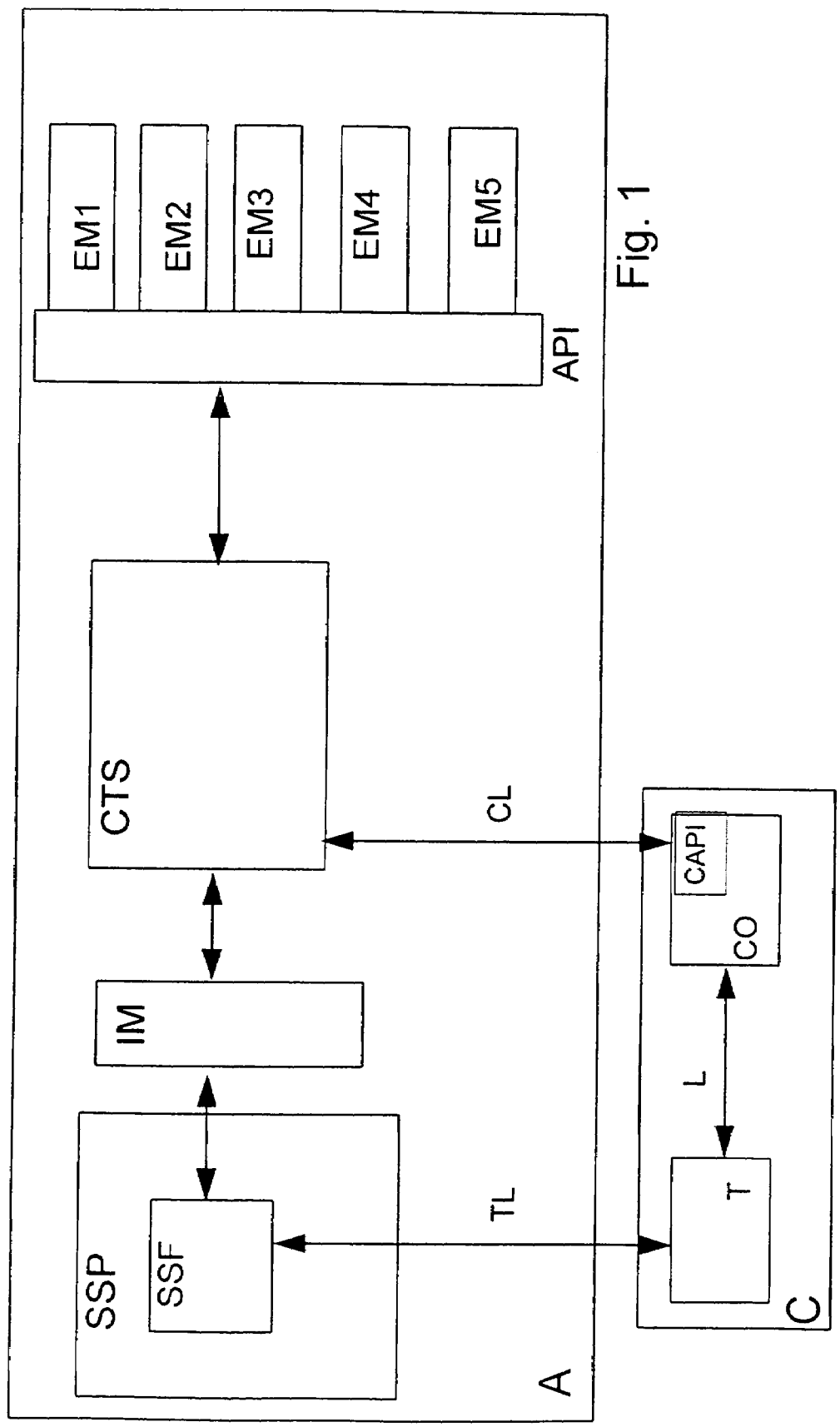
FIG. 1 schematically represents an apparatus A including an interface means IM according to the invention, FIG. 2 schematically depicts parts of the apparatus of FIG. 1, and illustrates how incoming CTI call handling messages are treated.

FIG. 1 shows an embodiment of an apparatus A for providing services such as automated call distribution services or other operator assisted services, to a customer C. The apparatus basically consists of a network switch SSP, an interface means IM, a CTI server means CTS, an application programming interface API and executable means for executing the service. In FIG. 1 several executable means are depicted, and denoted with EM1 to EM5, showing that several services, provided by these respective executable means, are provided. Both CTI server CTS as well as the executable means are installed on one or several computers, which are linked to each other. The interface means IM consists as well of a computer program which is installed on the same or on another computer, coupled in between the network switch SSP and the computer on which the CTI server CTS is installed. The applications performed by the different executable means comprise the mentioned services such as the automated call distribution service, wake-up service, billing service, statistics service and operator assisted services such as directory assistance and call completion.

The customer C of FIG. 1 is possessing a telephony apparatus T which is connected via a telephone link TL to the network switch SSP, and more particularly to the service switching function device SSF within the network switch. The customer as well includes a computer CO having its own application programming interface, in FIG. 1 denoted by CAPI. The latter is coupled via a computer link CL to the CTI server CTS. The telephony apparatus T of the customer is coupled to the computer CO of the customer by means of an internal link, denoted L. Such a customer may for instance consist of a single agent possessing merely a telephone terminal coupled to a stand-alone computer, but it may as well consist of for instance a large call center, including a private branch exchange PBX with a lot of internal telephone terminals coupled to it, coupled to a local area computer network of several interconnected computers.

CTI servers generally operate in the computer telephony integration, abbreviated with CTI, domain, whereas network switches operate in the public switching domain. Both domains are at the moment of the invention rather incompatible. CTI protocols include a minimum of call control commands such as make a call, clear a call etc. The majority of these CTI protocols have been defined by private switch suppliers to support access to and control of their own products. However a small number of standardised protocols have been defined of which CSTA, being the abbreviation of Computer Supported Telecommunications Applications, and supported by the European Computer Manufacturers Association, abbreviated by ECMA, is one of the most important.

Private branch exchanges, abbreviated with PBX, coupled to host computers on which CTI applications are running, in general are equipped with a so-called CTI-link, supporting one of the aforementioned CTI protocols such as the CSTA protocol. Public switches however are in general not equipped with such a link. When addressing services in the public switching domain, an intelligent network approach is used. Therein public network switches may act as a service switching point, which is further coupled to a service control point from which the services are invoked. Within the intelligent network environment however other protocols compared to CTI protocols apply. One of the standardised intelligent network protocols consists of Capability Set, abbreviated with CS, versions 1 and 2. However a different call handling model, compared to the one applicable in CTI protocols, is used within the intelligent network environment.

The subject invention envisages to offer services, generally associated to the CTI domain, as services within an intelligent network configuration. To this purpose an interface means is developed, which is adapted to communicate between a service switching function device SSF, running on the network switch SSP, and the CTI server means CTS In one embodiment of the interface means, the interface means is communication with a CSTA protocol at the CTI server means, and with a CS-2 protocol of the network switching function SSF.

However other versions of such interface means can be provided for interfacing with other public network service switching function protocols as well as with other CTI protocols, their basic architecture all corresponding to the one described in the following paragraphs.

Figure 2:
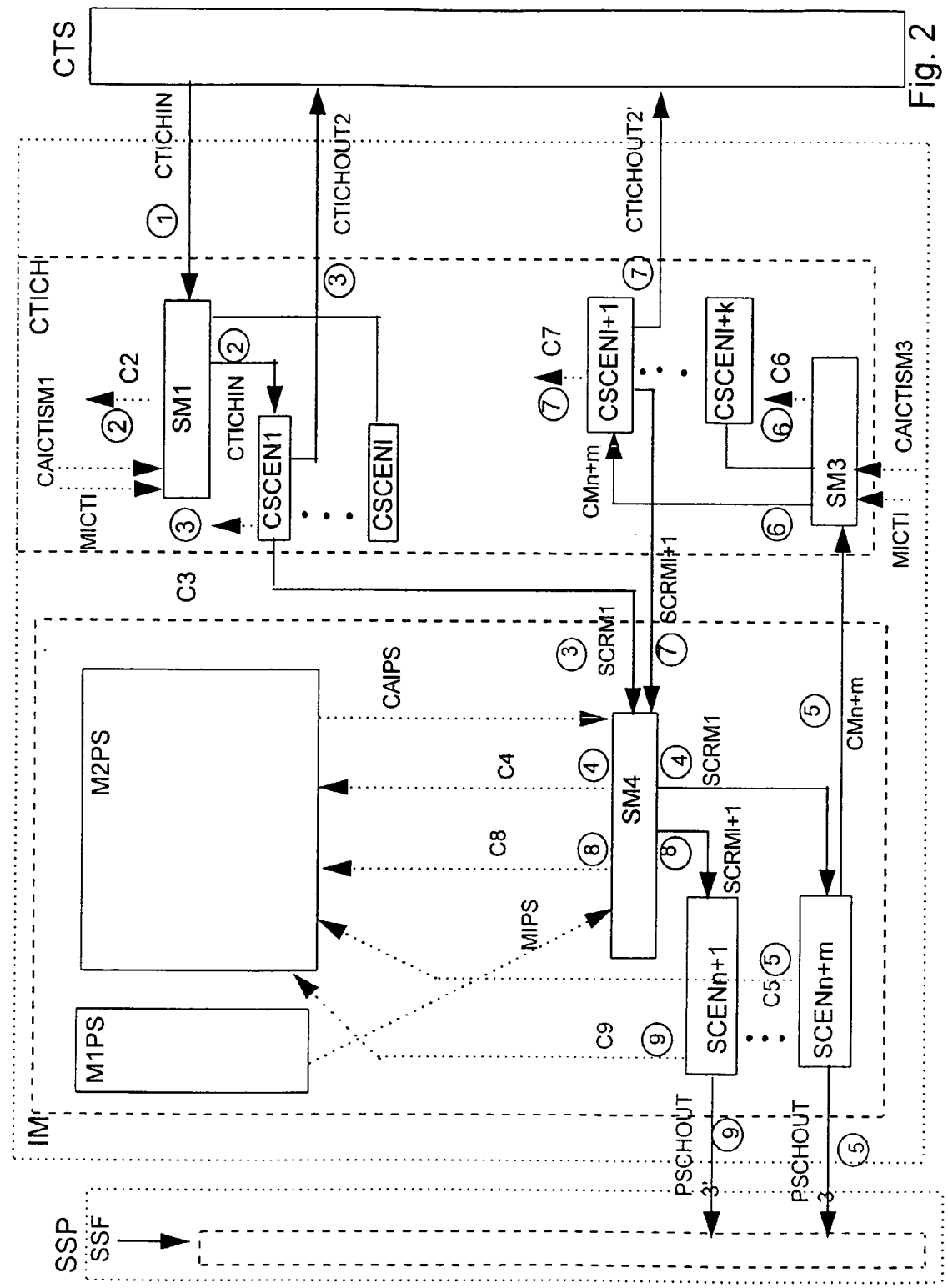
Figure 4:
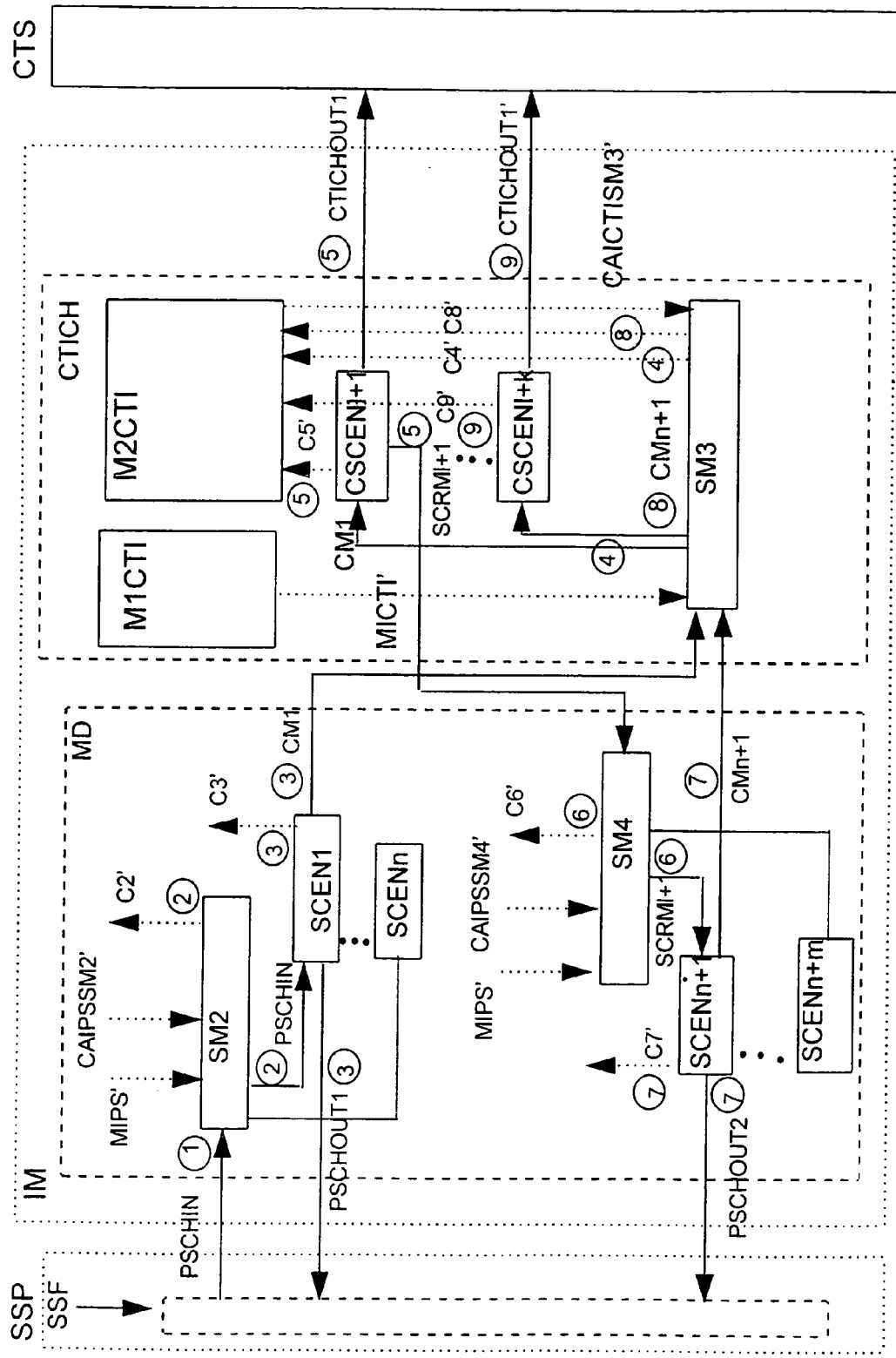
FIG. 4 schematically depicts parts of the apparatus of FIG. 1. And illustrates how incoming public switching call handling messages, are treated.

Such an interface means IM, as can be observed from FIGS. 2 and 4, in general consists of two main building blocks: a CTI call handling device, denoted with CTICH, and a mapping device, denoted with MD. Within these respective figures is depicted how CTI call handling messages, respectively public switching call handling messages, are treated within the interface means. The circles including different numbers thereby refer to the sequence of events, or generated signals, in function of the time. The circle including number 1 thus refers to the first event, the circle including number 2 then refers to the next event and so on.

As depicted in FIG. 2, call handling messages provided by the CTI server means CTS and originating from the CTI domain, are first received within a first selection means denoted SM1 and included within the CTI call handling device CTICH. In general the CTI call handling device is adapted to receive from the CTI server, CTI call handling messages such as the message CTICHIN, and to perform on respective calls associated with these respective call handling messages, call service scenario's as these are defined in the CTI domain. Thereby returning CTI call handling messages, such as CTICHOUT2 of FIG. 2, may be generated for transmission back to the CTI interface of the interface means. Besides generating appropriate CTI returning call handling message to the CTI domain, the CTI call handling device may as well generate service request control messages such as for instance SRCM1 of FIG. 2, for transmission towards the mapping device MD.

In the embodiment depicted in FIG. 2 I such CTI call service scenarios are available within the CTI call handling device CTICH for treating calls associated to CTI call handling messages originating from the CTI domain such as CTICHIN. The selection upon which of these I call service scenario's is to be executed, is performed by the first selection means denoted SM1. The latter device is adapted to decide, based on information extracted from the incoming call handling message, and based on information received from two memory devices incorporated within CTICH, which of the I CTI call service scenario's is to be performed on a specific call associated to that incoming call handling message. SM1 is therefore coupled, via I distinct connections of which only two are shown in order to not overload the drawings, to each of these I CTI call scenario devices denoted CSCEN1 to CSCENI. In FIG. 2 SM1 has selected device CSCEN1, for performing a same named CTI call service scenario, on the call associated to CTICHIN. Accordingly CTICHIN is provided towards CSCEN1, this representing a second event. At the same time that CTICHIN is delivered to CSCEN1, SM1 also generates another message, denoted C2, towards the a second CTI memory device, denoted M2CTI on FIG. 3 which is an extension of FIG. 2. Since for explaining the succession of call handling actions within the interface means these messages transmitted and received to these memory devices are in a first level not mandatory, their meaning and relevance to the invention will be described in a further paragraph of this document.

CTICHIN is received by CSCEN1, the latter device performing a same named call service scenario on the associated call. For the case depicted in FIG. 2, upon performing this CTI call service scenario, a returning CTI call handling message, denoted CTICHOUT2 is generated and transmitted back to the CTI server means CTS. At the same time a service request control message SCRM1 is also generated for transmission towards the mapping device MD. It has to be remarked however that not all CTI call service scenario's will result in the generation of such signals. Depending on which scenario is performed on which input message, either no output signals are generated, or only those of the returning CTI type, or only those of the service request control type, or any combination of both. Also more than one output signal of either type may be generated, any numerically combination of both type of output signals thus being the result. How many signals, and of which type, are generated, depends on the call service protocol used at the CTI side, on the scenario itself and on the input call handling message referring to a specific call.

Remark that, upon performing a call service scenario on an input message, a CTI call handling scenario device, for instance CSCSN1, is adapted to generate another type of message, such as C3 of FIG. 2, for transmission towards the second CTI memory device M2CTI.

The thus generated service request control message, SCRM1, is transmitted towards the mapping device MD. The latter includes a fourth selection means, denoted SM4 on FIG. 2, which is adapted to receive from the CTI call handling device CTICH a succession of such service request control messages. As was the case for the first selection means SM1, SM4 is adapted to forward an incoming message to one of a fourth plurality of public switching call service scenario devices, denoted SCENn+1 to SCENn+m. Which public switching call service scenario is selected for which input message, again depends on the input message itself, as well as on information transmitted from a first and second memory public switching device, M1PS and M2PS, included within the mapping device MD. Again, these memory devices as well as the signals transmitted and received by them will be discussed in a later paragraph of this document.

In the example depicted in FIG. 2, SM4 forwards SCRM1 to public switching service scenario device SCENn+m. The latter device is adapted to perform a same named public switching call service scenario on a call associated to input signal SCRM1. For the example depicted in FIG. 2 this results in a public switching call handling message PSCHOUT3 being generated, which is further transmitted to the service switching function device within the network switch SSP. At the same time a control signal, denoted CMn+m, is also generated and transmitted back to the CTI call handling device CTICH. The same remarks as for the CTI call service scenario devices are also valid for the mapping device: upon performing a public switching call service scenario, either no output signals may be generated, or any combination of a certain amount of public switching call handling messages and another amount of returning control messages towards the CTI side. The resulting output signals are function of the specific call service scenario performed, the input signals, the calls associated to them, and the information received from the two public switching memory devices as will be explained in a further paragraph.

Again, each time an action is performed, either by the fourth selection means SM4, or by the specific public switching call service scenario devices, a control signal is transmitted towards the second public switching memory device M2PS. These respective control signals are denoted C4 and C5, transmitted by the respective devices SM4 and SCENn+m upon having performed an action. Their importance will be discussed in the paragraph where the function of the respective memories will be explained.

As further depicted in FIG. 2, control message CMn+m transmitted by SCENn+m to the CTI side, is received within the CTI call handling device CTICH within a third selection means SM3. As for the already described other two selection means, SM3 is adapted to receive a succession of incoming messages, in this case consisting of control messages delivered by public switching call service scenario devices of the mapping device MD. SM3 is adapted to forward each of them to one of a third plurality of CTI call service scenario devices, denoted CSCENI+1 to CSCENI+k. Remark however that the CTI call service scenario devices that are coupled to SM3 are distinct from those coupled to SM1. Thus other call service scenario's are performed on calls associated to control messages received from the mapping device, compared to those on calls associated to incoming CTI call handling messages In the example depicted by FIG. 2, control message CMn+m is forwarded via SM3 to CTI call service scenario device CSCENI+1. The latter device then performs on the call associated to CMn+m a CTI call service scenario also denoted CSCENI+1. Also in this case the result being another returning CTI call handling message CTICHOUT2' as well as another service request control message SCRPMI+1.

Again, messages are generated by SM3 and CSCENI+1 for transmission to the second CTI memory device M2CTI. These messages are respectively denoted C6 and C7.

The service request control message SCRMI+1, generated by CSCENI+1 is now transmitted back towards the fourth selection means SM4. The latter device now selects SCENn+1 to perform a same named public switching call service scenario on the call associated to SCRMI+1. In this case the result will only be another public switching call handling message PSCHOUT3', which will be delivered to the network switch. No further message is generated for transmission towards the CTI side. Only two extra messages, C8 and C9 are additionally generated by SM4, resp. SCENn+1, for transmission towards M2CTI. The call handling is thereby finished for the example depicted in FIG. 2., which started with an incoming CTI call handling message, and which resulted in two returning CTI call handling messages and two public switching call handling messages being generated.

FIG. 4 gives an example of the actions performed by the interface means, whereby the input signal is now delivered by the service switching function device SSF within the network switch SSP.

This input signal is denoted PSCHIN, being a public switching call handling message. This message is received by the mapping device MD, and more particularly by a second selection means SM2 included therein.

SM2 then forwards the incoming public switching call handling message PSCHIN to one of a second plurality of public switching call service scenario devices SCEN1 to SCENn. Remark that also these public switching call service scenario devices included within this second plurality are different from those included in the fourth plurality, which were receiving service request control messages from the CTI call handling device CTICH.

For the example depicted in FIG. 4 SM2 is adapted to forward PSCHIN to public switching service scenario device SCEN1. The latter is adapted to perform a same named public switching call service scenario on the call associated with PSCHIN, and to thereby generate a returning public switching call handling message PSCHOUT1, as well as a control message CM1 for delivery to the CTI call handling device.

The same remark concerning the generation of output signals as well as signals towards the memory devices, is valid for any public switching call service scenario device included in the second plurality, as for the public switching call service scenario devices included in the other already described pluralities. Thus two more signals are generated: C2' by SM2 and C3' by SCEN1, these signals being transmitted towards the second public switching memory device M2PS.

CM1 is then transmitted towards the CTI call handling device CTICH, where it is received by the third selection means SM3, as was the case for the signal CMn+m of FIG. 2. From now on more or less the same procedure as was described in FIG. 2 is followed: SM3 forwards the control message CM1 to one of the CTI call service scenario devices of the third plurality, which then performs a CTI call service scenario on the call associated to the control message, and eventually generates output signals to the CTI and/or to the public network side. In FIG. 4 CM1 is forwarded to CSCENI+1. The latter device, upon having performed a same named CTI call service scenario, generates a CTI call handling message CTICHOUT1 for delivery to the CTI server means CTS, and a service request control message SCRMI+1 which is accordingly transmitted to the fourth selection means SM4 of the mapping device MD. SM4 selects SCENn+1 to be the one to be performed on the call associated to SCRMI+1. Upon performing this public switching call service scenario, another returning public switching call handling message PSCHOUT2 is generated, as well as another control message CMn+1. The latter is received by SM3, which now selects CSCENI+k to be the CTI service scenario to be performed on the call associated with CMn+1. Thereby a final CTI call handling message CTICHOUT1' is generated for transmission to the CTI server means CTS.

As already mentioned, each time one of the described devices incorporated within the mapping device and the CTI call handling device, has performed an action, a control message towards either a second public switching memory or a second CTI memory device was transmitted. The second CTI memory device, denoted M2CTI, thereby received signals denoted C4', C5', C8' and C9', transmitted from respective devices SM3, CSCENI+1, SM3 and CSCENI+k for the case depicted in FIG. 4. The second public switching memory device M2PS, depicted on FIG. 5 which is an extension of FIG. 4, thereby received C2', C3', C6' and C7' from respective devices SM2, SCEN1, SM4 and SCENn+1. For the case depicted in FIG. 2, M2PS received signals denoted C4, C5, C8 and C9 from respective devices SM4, SCENn+m, SM4 and SCENn+1 and M2CTI, depicted in FIG. 3 which is an extension of FIG. 2, received signals denoted C2, C3, C6 and C7 from respective devices SM1, CSCEN1, SM3 and CSCENI+1.

Besides the second CTI and public switching memory devices, M2CTI and M2PS, the CTI call handling device, respectively mapping device, also include a first CTI memory device M1CTI, and a first public switching memory device M1PS respectively.

The first public switching memory device M1PS stores data concerning the public switching call model as well as concerning the public switching subscriber profile. This data is stored within M1PS during initialisation of the interface means and will not change during the operation of the interface means or of the apparatus. Similarly the first CTI memory device M1CTI stores information regarding the CTI call model and CTI subscriber profile, again provided to this memory device during initialisation of the interface means.

Figure 5:
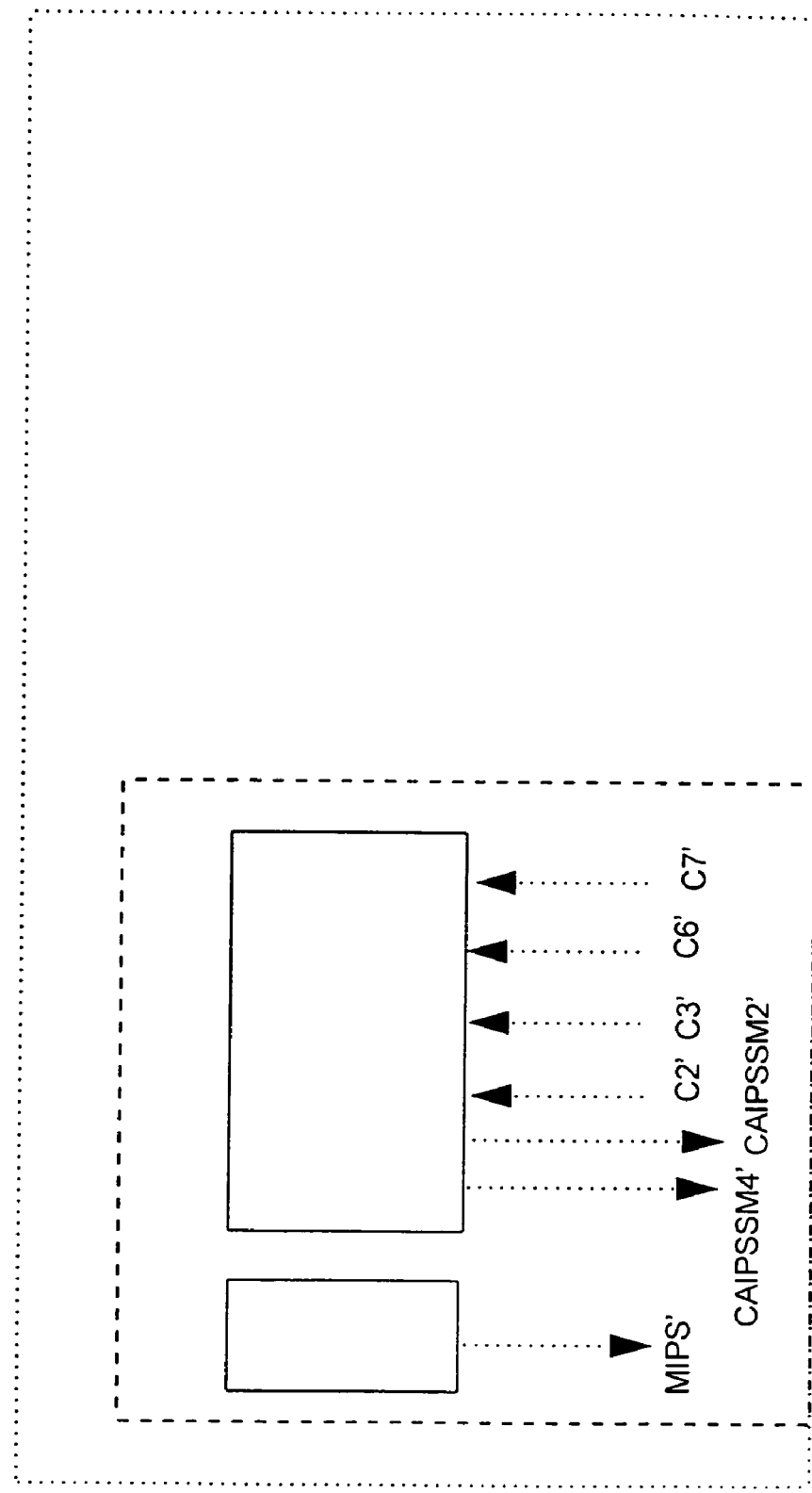
FIG. 5 is a continuation of the drawing of FIG. 4, depicting further parts of the mapping device of FIG. 4.

The second public switching memory device M2PS on the other hand stores data concerning the public switching call attributes of each treated call, such as the calling number, the called number, and the states in which this specific call may reside, according to a specific public switching call model. Since this data is continuously changing, especially during operation of the interface means, the second public switching memory device M2PS continuously is to be updated with the latest value of the call attributes. This is done by means of the signals transmitted by each of the public switching call scenario devices or selection means, included within the mapping device, upon having performed a particular action on a specific call. Indeed, in one embodiment of the interface means the mentioned devices are adapted to, upon receiving an incoming message, either a public switching call handling message or a service request control message from by the CTI call handling device, to extract from this incoming message, information related to the actual value of the public switching call attributes of the call associated to this incoming message, to determine therefrom at least one updated value of the call attributes of this call, and to transmit this information back to the second public switching memory device. Within the second selection means, the calculation of the updated call attributes is thereby based upon the actual value of the call attributes extracted from the incoming message, but also based on public switching call model and subscriber profile data delivered by the first public switching memory means, and based on public switching call attribute information, stored within and delivered by the second public switching memory device M2PS. In FIGS. 4 and 5, the signal including the public switching call model and subscriber profile data, transmitted from the first public switching memory device M1PS to both SM2 and SM4 is denoted M1PS'. The signal containing the latest value of at least one of the public switching call attributes, provided by M2PS to SM2 is denoted CAIPSSM2'. In some embodiments, both information signals are only delivered to SM2, upon request of SM2. SM2 thus only asks M1PS or M2PS for the information, if required, in order to enable SM2 to calculate the updated call attributes of the call associated to the incoming messages. At the same time, all this requested and extracted information also enables SM2 to accordingly select the appropriate public switching call handling scenario to be performed on an incoming public switching call handling message, in accordance to a particular public switching call handling model such as for instance the CS2 model. Once the at least one updated value of the call attributes are then determined by SM2, this second selection means provides this information back to M2PS by means of signal C2 of FIG. 4, M2PS accordingly storing the thus received updated call attributes.

The public switching call scenario devices are also adapted to first calculate the call attributes of the call associated to an incoming message, from information extracted from this message. In the embodiment depicted in FIG. 4, no information is however provided from the memory devices towards the call service scenario devices. To yet allow the latter devices to determine the correct updated value of the call attributes, in this embodiment the second selection device further provides the selected call service scenario device with this necessary information, which SM2 calculated earlier. This is not shown on the figures in order to not overload them. Anyway, upon having performed a public switching call service scenario, each of these public switching call service scenario devices also provides M2PS with information concerning the updated value of the associated call attributes. This information is thus contained within for instance signal C3' on FIG. 4.

The fourth selection means SM4, which is receiving a incoming CTI call handling device message, also extracts from this message call attribute information. Since this message is provided by the CTI call handling means, in this embodiment, the extracted call attributes are however CTI call attributes. SM4 thus is to be additionally adapted to perform a conversion between the extracted CTI call attributes and corresponding public switching call attributes. After performing this conversion, the same procedure as for SM2 is followed: at least one updated value of the public switching call attributes is determined from the values extracted from the incoming message, and from information provided, eventually on request, by both memory devices M1PS and M2PS. This information is provided, possibly on request from SM4, from these respective memory devices by means of respective information signals MIPS' and CAIPSSM4'. Similarly, upon calculating the at least one updated call attribute values, the latter are provided by to M2PS by means of a signal such as for instance C6' in FIG. 4. Similar to SM2, the fourth selection means SM4, also uses the provided and extracted information to properly select one public switching call service scenario out of the fourth plurality. And for the embodiment depicted in FIG. 4, the fourth selection device also provides a selected public switching call handling scenario device with further information to allow the latter to properly determine the updated call attributes (this is however not shown on FIG. 4). Upon having determined these updated call attributes, they are provided to the second public switching memory device by means of another information signal such as for instance C7' of FIG. 4, transmitted from SCENn+1 to M2PS.

A similar procedure is taking place in the CTI call handling device CTICH. Therein also the second CTI memory device M2CTI is to be continuously updated in order to store the latest values of the CTI call attributes of each treated call. To this purpose, the different selection means SM1 and SM3 and CTI call service scenario devices included within the first and second plurality of CTI call service scenario devices, are each providing this second CTI memory device with the updated value of the call attributes they determined, upon performing their specific task on an incoming message. The selection means SM1 and SM3 thereby calculate at least one updated value of the CTI call attributes of the call associated to their input message, by first extracting from this incoming message the actual CTI call attributes of the associated call. For SM1, receiving a CTI call handling message, this can be performed in a rather straightforward way, by analysing the incoming CTI message. For SM3, receiving a control message from the public switching domain, thus containing references to public switching call attributes, these are first extracted from the control message, after which step SM3 has to perform a conversion from these extracted public switching call attributes in the public switching domain, to corresponding CTI call attributes in the CTI domain.

The updated values of the CTI call attributes are then further calculated based on information received from both CTI memory devices, which may be, although not necessary, specifically requested by the respective selection means. The CTI call model and subscriber profile data is provided by the first CTI memory device M1CTI towards both selection means, by means of the signal denoted M1CTI in FIG. 2 and FIG. 3. The latest value of the requested CTI call attributes is provided by M2CTI to SM1 by means of information signal CAICTISM1, and to SM3 by means of information signal CAICTISM3.

Both selection devices SM1 and SM3 not only use the thus provided information for calculating the updated call attributes, but also for selecting one of the CTI call service scenario devices of the first, respectively third plurality.

Figure 3:
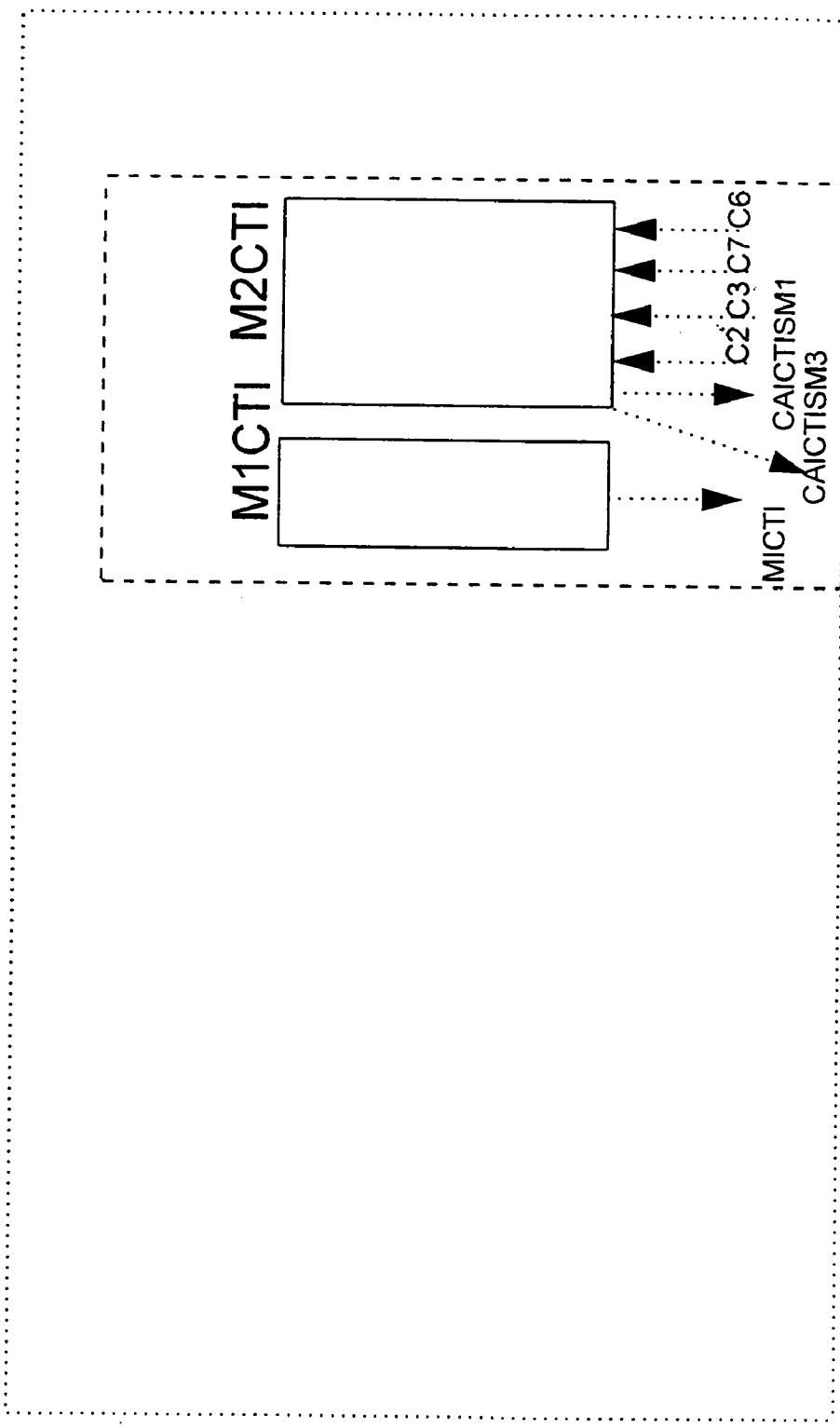
FIG. 3 is a continuation of the drawing of FIG. 2, depicting further parts of the CTI call handling device of FIG. 2

Upon having calculated the at least one updated value of the CTI call attributes associated to their incoming messages, SM1 and SM3 provide this information back to M2CTI by means of for instance respective signals denoted C2 and C6 of FIGS. 2 and 3.

Also the CTI call service scenario devices are calculating at least one updated value of the CTI call attributes associated to incoming messages. In the embodiment depicted in FIGS. 2 and 4, no information is provided from both CTI memory devices to the CTI call service scenario devices, therefore the selection means coupled to the respective CTI call service scenario devices, are providing these with this necessary information (not shown in these figures).

However other embodiments of the interface means exist where this information is provided directly from the memory means to the service scenario devices. Since different implementations for updating the call states by the selection means and call service scenario means are commonly known to a person skilled in the art, these will not be further discussed within this document.

Upon having calculated the at least one updated value of the call attributes associated to their input messages, the CTI call service scenario devices are communicating this information to the second CTI memory means. In FIG. 2 this is depicted by the signals C3 and C7, respectively generated and transmitted by CSCEN1 and CSCENn+1. For the case depicted in FIG. 4, CSCENI+1 and CSCENI+k are generating and transmitting signals C5' and C9'; whereas SM3 has generated and transmitted C4' and C8' towards M2CTI.

Figure 6:
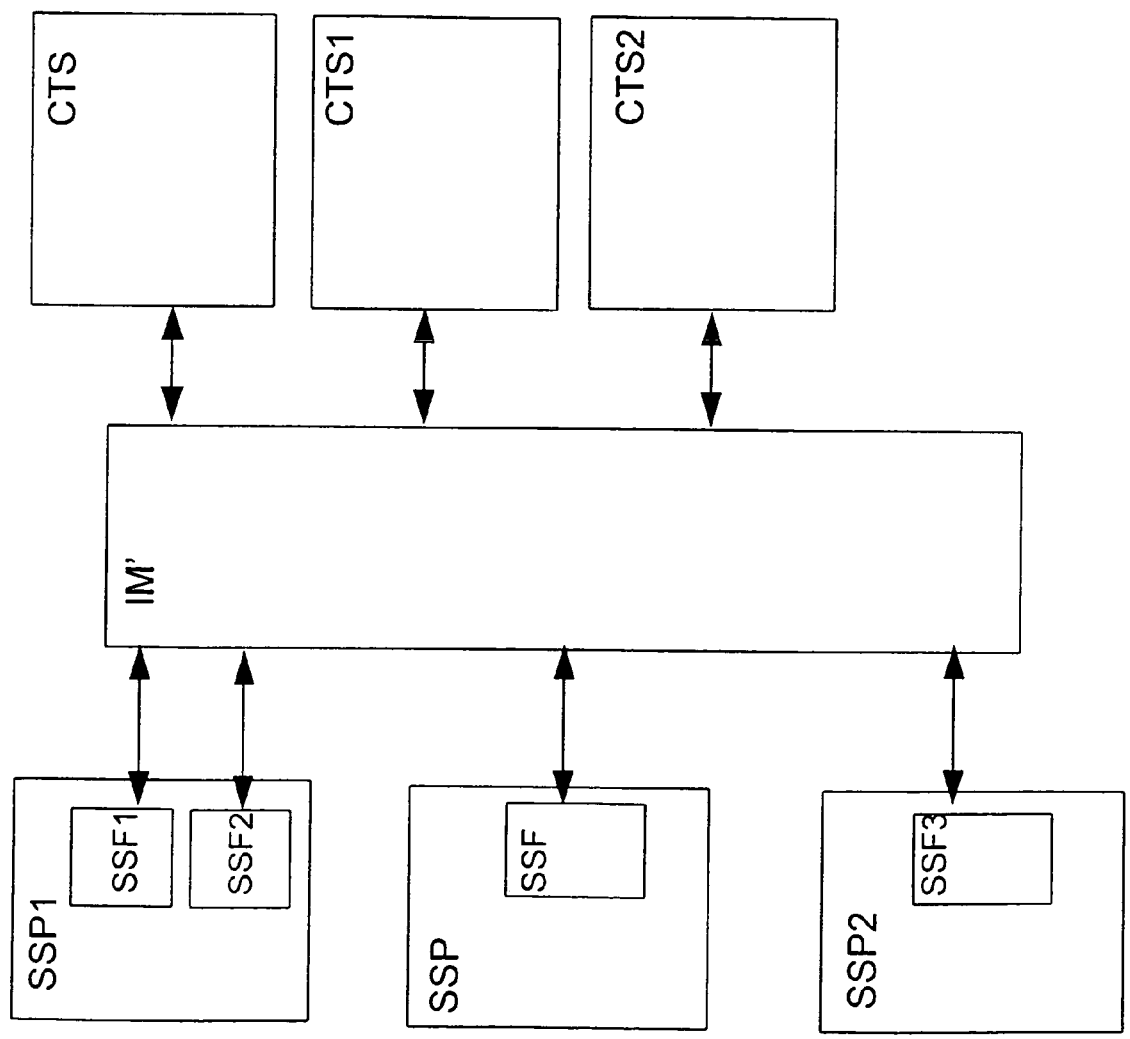
FIG. 6 schematically shows an embodiment of an interface means, interfacing with several service switching devices and with several CTI servers.

Until now the apparatus has been described for the case one interface means is coupled between one network switch and one CTI server. In a more general case however, such as depicted in FIG. 6, an interface means IM' is adapted to interface with more than one service switching device, and with more than one CTI server. In FIG. 6 these different service switching devices are denoted SSF, SSF1, SSF2 and SSF3, and the different CTI servers are denoted CTS, CTS1, and CTS2. These different service switching devices may be incorporated in the same network switch, or distributed over several network switches, such as shown in the embodiment of FIG. 6, where service switching devices SSF1 and SSF2 are part of the same network switch SSP1, SSF is part of network switch SSP, and SSF3 is part of SSP2. This presents the advantage of increased performance with respect to offered applications, since each CTI server is in general coupled to an application programming interface (not shown on FIG. 6), and increased performance with respect to network-wide coverage.

For implementing such an interface means IM', several options are possible. Within a first realisation, each service switching function device is coupled to a corresponding mapping device, and each CTI server means is coupled to a corresponding CTI call handling device. The communication signals between the respective mapping devices and CTI call handling devices thereby reflect which service switching function device is to be coupled to which CTI server means, at both sides of the interface means. Since however several CTI servers have to be able to share the same CTI objects such as the call states etc., within this first realisation the different memories of these different CTI server means have to be shared. Within a second realisation, each service switching function device is again coupled to a corresponding mapping device, but there is only one big CTI call handling device interfacing with all CTI server means.

An additional remark is related to processing power considerations. An interface means, such as IM and IM' previously described, in general consists of a computer program, running on a computer, processor or server. In order to increase performance such as speed, additional processing power can be added. A consequence of this is the distribution of the operation of this computer program constituting the interface means, over different processors or servers. Thereby, reliability is also increased. Furthermore, servers can be physically placed close to the server on which the applications are running, or may be the same, thereby reducing possible delays.

While the principles of the invention have been described above in connection with specific apparatus, it is to be clearly understood that this description is made only by way of example and not as a limitation on the scope of the invention, as defined in the appended claims.

What is claimed is:

1. A method for providing a telephony service, the method comprising:
   coupling an interface device directly between a network switch of a public intelligent network and a computer telephony integration server, the network switch being coupled to a service switching function device having service switching functionality;
   at the interface device, handling call handling messages between the service switching function device and the computer telephony integration server.

2. The method according to claim 1, wherein the handling of the call handling messages comprises:
   receiving at a computer telephony integration call handling device of the interface device a call handling message from the computer telephony integration server; and
   performing at the computer telephony integration call handling device an operation corresponding to the call handling message at least one computer telephony integration call service scenario.

3. The method according to claim 2, further comprising generating at the computer telephony integration call handling device a returning computer telephony integration call handling message for delivery to the computer telephony integration server upon performing the at least one computer telephony integration call service scenario.

4. The method according to claim 2, further comprising generating at the computer telephony integration call handling device a service request control message for delivery towards the service switching function device upon performing the at least one computer telephony integration call service scenario.

5. The method of claim 2, further comprising:
   receiving at a mapping device of the interface device a public switching call handling message from the service switching function device; and
   performing at mapping device an operation corresponding to the public switching call handling message for at least one public switching call service scenario.

6. The method according to claim 5, further comprising generating at the mapping device a returning public switching call handling message for delivery to the service switching function device upon performing the at least one public switching call service scenario.

7. The method according to claim 5, further comprising generating at the mapping device a control message for delivery towards the computer telephony integration server upon performing the at least one public switching call service scenario.

8. The method according to claim 5, further comprising:
   receiving at the computer telephony integration call handling device a mapping device message from the mapping device; and
   performing at the computer telephony integration call handling device at least one other computer telephony integration call service scenario associated with the mapping device message.

9. The method according to claim 8, further comprising generating at the computer telephony integration call handling device at least one other returning computer telephony integration call handling message for delivery to the computer telephony integration server upon performing the at least one other computer telephony integration call service scenario.

10. The method according to claim 8, further comprising generating at the computer telephony integration call handling device at least one other service request control message for delivery to the mapping device upon performing the at least one other computer telephony integration call service scenario.

11. The method according to claim 5, further comprising:
   receiving at the mapping device a computer telephony integration call handling device message from the computer telephony integration call handling device; and
   performing at the mapping device at least one other public switching call service scenario upon a specific call associated to the computer telephony integration call handling device message.

12. The method according to claim 11, further comprising generating at the mapping device at least one other returning public switching call handling message for delivery towards the service switching device upon performing the at least one other public switching call service scenario.

13. The method according to claim 11, further comprising generating at the mapping device at least one other control message for delivery towards the computer telephony integration call handling device upon performing the at least one other public switching call service scenario.

14. The method according to claim 2, further comprising:
   determining at the computer telephony integration call handling device the value of the computer telephony integration call attributes of the public switching call handling message upon receiving the computer telephony integration call handling message, and
   determining at the computer telephony integration call handling device at least one updated value of the computer telephony integration call attributes of the public switching call handling message upon performing the at least one computer telephony integration call service scenario.

15. The method according to claim 5, further comprising:
determining at the mapping device the value of the public switching call attributes of the call, upon receiving the public switching call handling message; and
determining at the mapping device at least one updated value of the computer telephony integration call attributes of the call, upon performing the at least one public switching call service scenario.

16. The method according to claim 8, further comprising:
determining at the computer telephony integration call handling device the value of the computer telephony integration call attributes of the particular call, upon receiving the mapping device message; and
determining at the computer telephony integration call handling device at least one update value of the computer telephony integration call attributes of the particular call, upon performing the at least one other computer telephony integration call service scenario.

17. The method according to claim 11, further comprising:
determining at the mapping device the value of the public switching call attributes of the specific call, upon receiving the computer telephony integration call handling device message; and
determining at the mapping device at least one updated value of the public switching call attributes of the specific call, upon performing the at least one other public switching call service scenario.

18. The method according to claim 14, further comprising:
receiving at the computer telephony integration call handling device a succession of incoming computer telephony integration call handling messages including the computer telephony integration call handling message from the computer telephony integration server; and
receiving at the computer telephony integration call handling device an incoming computer telephony integration call handling message of the succession, and forwarding the incoming computer telephony integration call handling message to a computer telephony integration service scenario device of a first plurality of computer telephony integration call service scenario devices included within the computer telephony integration call handling device, each of the computer telephony integration call service scenario devices of the first plurality being adapted to perform a distinct computer telephony integration call service scenario,
the computer telephony integration call service scenario device of the first plurality is thereby selected by a first selection means based upon at least one value of the computer telephony integration call attributes of the call associated to the incoming computer telephony integration call handling message.

19. The method according to claim 15, further comprising
receiving at the mapping device a succession of incoming public switching call handling messages including the public switching call handling message from the service switching function device; and
receiving at the mapping device an incoming public switching call handling message of the succession, and forwarding the incoming public switching call handling message to a public switching service scenario device of a second plurality of public switching call service scenario devices included within the mapping device, each of the public switching call service scenario devices of the second plurality being adapted to perform a distinct public switching call service scenario,
the public switching call service scenario device of the second plurality is thereby selected by a second selection means based upon at least one value of the public switching call attributes of the call associated to the incoming public switching call handling message.

20. The method according to claim 16, further comprising
receiving at the computer telephony integration call handling device a succession of incoming mapping device messages including the mapping device message; and
receiving at the computer telephony integration call handling device an incoming mapping device message of the succession, and forwarding the incoming computer telephony integration call handling message to a computer telephony integration service scenario device of a third plurality of computer telephony integration call service scenario devices included within the computer telephony integration call handling device, each of the computer telephony integration call service scenario devices of the third plurality being adapted to perform a distinct computer telephony integration call service scenario,
the computer telephony integration call service scenario device of the third plurality is thereby selected by a third selection means based upon at least one value of the computer telephony integration call attributes of the call associated to the incoming mapping device message.

21. The method according to claim 17, further comprising
receiving at the mapping device a succession of incoming computer telephony integration call handling messages including the computer telephony integration call handling message; and
receiving at the mapping device an incoming computer telephony integration call handling message of the succession, and forwarding the incoming computer telephony integration call handling message to a public switching service scenario device of a fourth plurality of a public switching call service scenario devices included within a mapping device, each of the public switching call service scenario devices of the fourth plurality being adapted to perform a distinct public switching call service scenario,
the public switching call service scenario device of the fourth plurality is thereby selected by a fourth selection means based upon at least one value of the public switching call attributes of the call associated to the incoming computer telephony integration call handling device message.

22. The method according to claim 20, wherein the computer telephony integration call service scenarios performed by the computer telephony integration call service scenario devices of the plurality are substantially different from the computer telephony integration call service scenario's performed by the computer telephony integration call service scenario devices of the third plurality.

23. The method according to claim 21, wherein the public switching call service scenarios performed by the public switching call service scenario devices of the second plurality are substantially different from the public switching call service scenario's performed by the public switching call service scenario devices of the fourth plurality.

24. The method according to claim 1, wherein said interface device is adapted to communicate between a plurality of service switching function devices including the service switching function device, and the computer telephony integration server, each of the service switching function devices having a service switching functionality.

25. The method according to claim 1, wherein the interface device is adapted to communicate between said service switching function device and a plurality of computer telephony integration server, including the computer telephony integration server.

* * * * *